United States Patent Office 2,797,006
Patented June 25, 1957

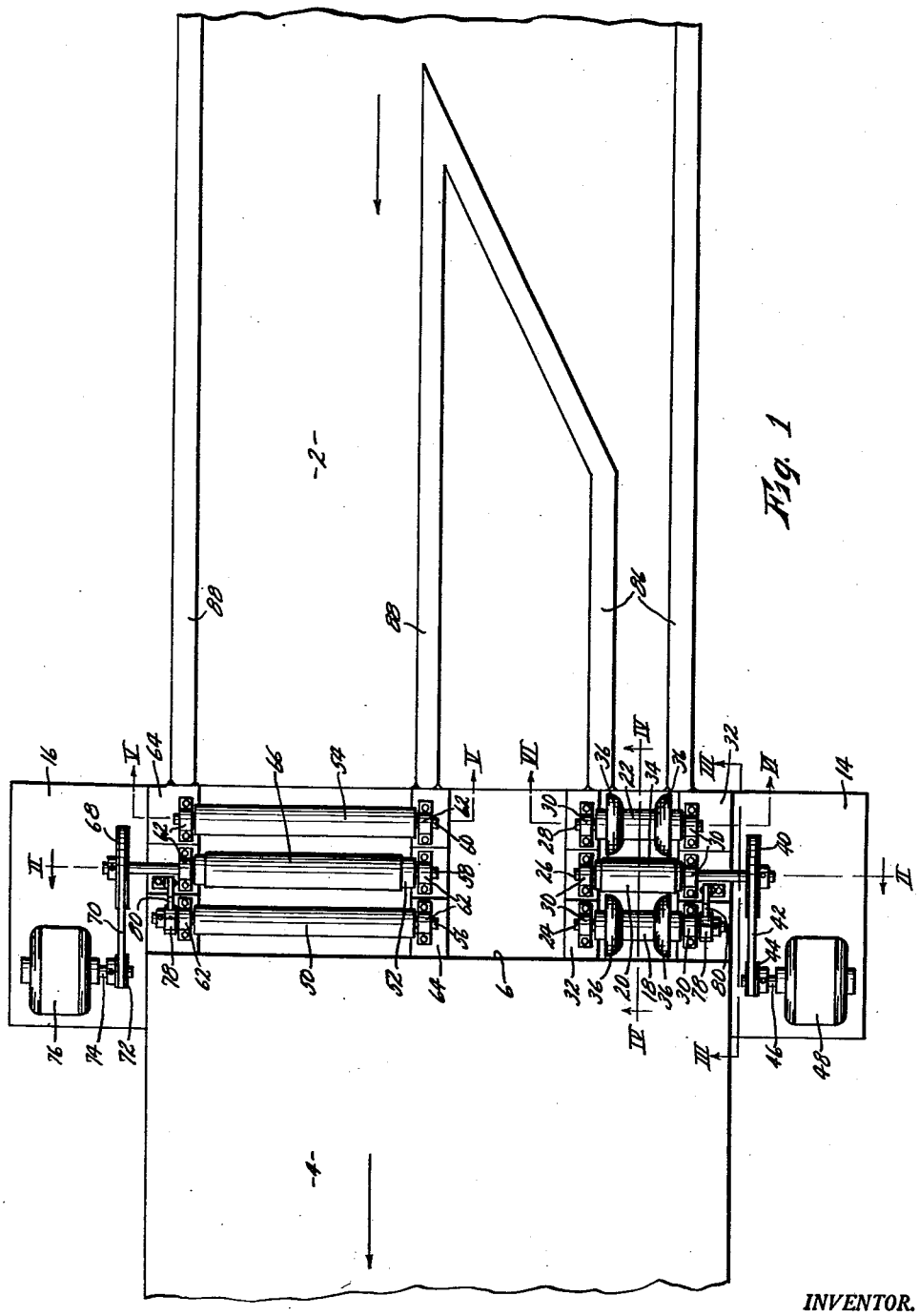

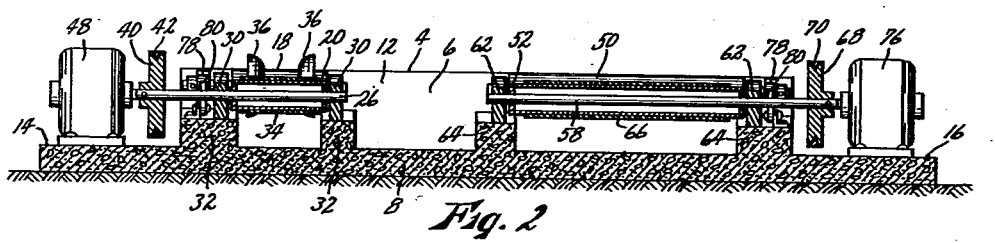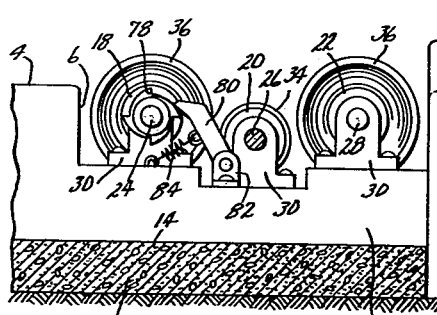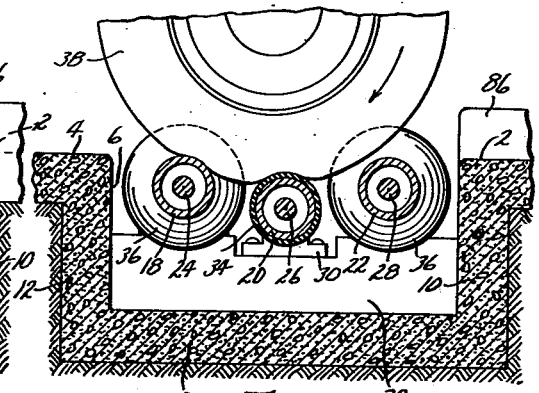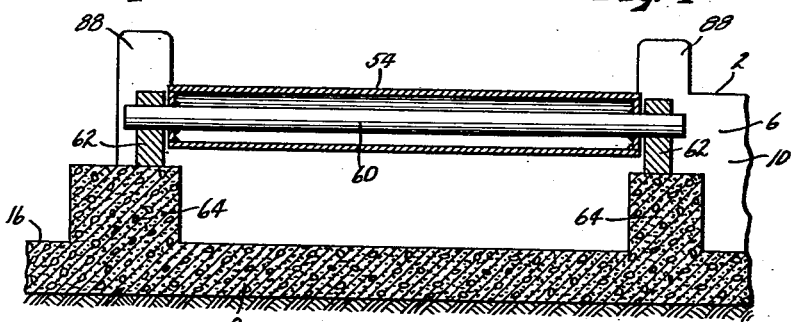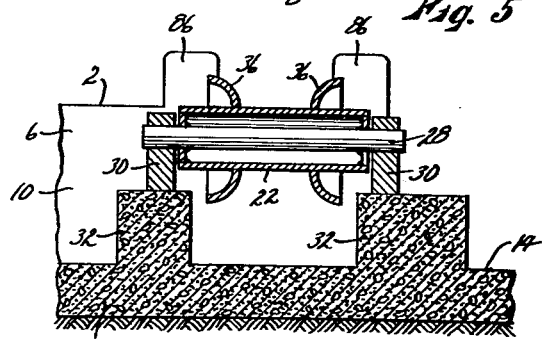

2,797,006

REVOLVING WHEEL SUPPORT FOR AUTOMOBILES

Lew A. Thompson, Kansas City, Mo.

Application June 18, 1953, Serial No. 362,550

2 Claims. (Cl. 214—340)

This invention relates to new and useful improvements in revolving wheel supports for automobiles, and relates particularly to a device for supporting and revolving the wheels of an automobile in order to facilitate the scrubbing or washing of said wheels by holding a brush or the like thereagainst as they turn, although it will be readily understood that the use of the device is not so limited.

The principal object of the present invention is the provision of a wheel supporting device of the character described including rollers positioned to support the automobile wheels in such a manner as to require a minimum of power to turn the wheels, and to eliminate the tendency of wheel misalignment to cause lateral drifting of the wheels on the rollers.

Another object is the provision of a wheel supporting device of the character described which is particularly adapted to receive automobiles wherein the distance between the wheels may vary over a considerable range.

Other objects are simplicity and economy of structure, efficiency and dependability of operation, and adaptability for use whenever it is desired to rotate the wheels of an automobile as the automobile remains stationary.

With these objects in view, as well as other objects which will appear in the course of the specification, reference will be had to the drawing, wherein:

Fig. 1 is a plan view, partially broken away, of a wheel supporting device embodying the present invention.

Fig. 2 is a sectional view taken on line II—II of Fig. 1.

Fig. 3 is an enlarged fragmentary sectional view taken on line III—III of Fig. 1.

Fig. 4 is an enlarged fragmentary sectional view taken on line IV—IV of Fig. 1, showing an automobile wheel in operative relationship thereto.

Fig. 5 is an enlarged fragmentary sectional view taken on line V—V of Fig. 1.

Fig. 6 is an enlarged fragmentary sectional view taken on line VI—VI of Fig. 1.

Like reference numerals apply to similar parts throughout the several views, and the numerals 2 and 4 apply respectively to an entry ramp and an exit ramp disposed in coplanar relation. Said ramps, which form the base of the structure, may be of any suitable construction, but are illustrated as concrete slabs supported directly on the ground. Automobiles may be driven over the ramps in the direction indicated by the arrows in Fig. 1. The ramps are separated by a trough 6 having a floor 8 connected to the adjacent edges of ramps 2 and 4 by vertical walls 10 and 12 respectively. Ramps 2 and 4, floor 8, and walls 10 and 12 may be integral. Floor 8 is extended transversely outwardly from the sides of the ramps to form platforms 14 and 16 for supporting the drive motors as hereinafter described.

At the left edge of the ramps, viewed in the direction of travel the arrows in Fig. 1, a set of three rollers 18, 20 and 22 are supported rotatably in trough 6 on horizontal axes extending transversely to the line of automobile travel, said rollers being fixed respectively on shafts 24, 26, and 28 which are journalled on suitable bearings 30 mounted on ribs 32 formed integrally with trough floor 8. As best shown in Figs. 3 and 4, the outer rollers 18 and 22 of the set are disposed with their topmost sides substantially coplanar with ramps 2 and 4, while the central roller 20 of the set is disposed somewhat lower.

Roller 20 is provided with a non-skid covering 34 of rubber or other suitable material and each of rollers 18 and 22 is provided with a pair of confronting bell-shaped guides 36 affixed thereto in spaced apart relation, so that an automobile wheel 38 driven onto the rollers will be centered on the rollers and prevented from drifting laterally off of the ends of the rollers as it is rotated. The spacing between the guides 36 is such as to receive therebetween the thickest tire which the device will be required to support. Shaft 26 is extended outwardly, and has a pulley 40 fixed thereon, said pulley being operatively connected by means of belt 42 to a pulley 44 mounted on the drive shaft 46 of an electric motor 48 mounted on platform 14. Said motor is adapted to turn roller 20 to drive the automobile wheel 38 in the direction indicated by the arrow in Fig. 4.

At the right edge of the ramps, viewed in the direction of the arrows in Fig. 1, a set of three rollers 50, 52, and 54 are disposed in trough 6. Said rollers are respectively coaxial with rollers 18, 20 and 22, but are axially elongated as compared to the latter. Rollers 50, 52 and 54 are fixed respectively on shafts 56, 58 and 60 which are journalled in bearings 62 mounted on ribs 64 integral with the trough floor 8. The central roller 52 of the set is provided with a non-skid covering 66, and the extended end of shaft 58 of said roller is provided with a pulley 68 operatively connected by means of belt 70 with a pulley 72 mounted on the drive shaft 74 of a motor 76 which is mounted on platform 16.

Each of the rollers 18 and 50 has a toothed ratchet wheel 78 fixed to the outwardly extended end of the shaft thereof (Figs. 1 and 3). Each of said ratchet wheels is engaged by the free end of a dog 80, which is pivoted at its opposite end to a bracket 82 mounted on the adjacent trough rib 32 or 64, said dog being urged against the ratchet wheel by a spring 84 (Fig. 3). This ratchet and dog arrangement is adapted to permit the rotation of rollers 18 and 50 in a direction corresponding to rearward travel of the automobile but to prevent rotation of said rollers in the opposite direction.

In operation, the automobile is first driven over entry ramp 2 until the front wheels rest respectively over the left and right sets of rollers. Said entry ramp is provided with a pair of raised curbs 86 adapted to guide the left wheel accurately onto roller set 18—20—22, and a pair of curbs 88 corresponding approximately with the ends of roller set 50—52—54. The position of the right wheel on the latter roller set depends on the transverse spacing between the wheels, and the device is thus adapted for use with automobiles of a wide range of widths. Motors 48 and 76 may then be energized either separately or simultaneously to turn rollers 20 and 52, which engage and rotate the automobile wheels in a direction corresponding to rearward travel of the automobile. The wheels may then be scrubbed by holding a brush thereagainst as they rotate, or any other operation performed which requires the rotation of the wheels.

It will be noted, particularly in Fig. 4, that the center roller is disposed a distance below the outer rollers such that the radius of the arc determined by their centers is greater than the radius of the car wheel 38. In other words, the car wheel will rest on the center roller, but can engage only one of the outer rollers. This relationship must obtain for the largest car wheel to be supported. This relationship has two important functions. First, it provides that the car wheel will always have full pressure contact with the central driving roller, regardless of the wheel diameter. Secondly, it compensates for the fact that particularly the front wheels of automobiles are often misaligned or offset; that is, one front wheel may be disposed either to the front or to the rear of the other front wheel. If the supporting roller sets were disposed so as to tend to force the car wheels into coaxial relation, such misalignment would cause a binding action which would greatly overload the driving motors, and create a strong tendency of the wheels to travel longitudinally along the rollers. In the present structure, however, if one wheel is disposed as in Fig. 4 on the central and front rollers, the other wheel may be riding only on the central roller, or even also contacting the rear roller.

After the wheel washing or other operation has been completed on the front car wheels, the car is driven forwardly until the rear wheels rest on the rollers, and the operation repeated. The rear car wheels may of course be turned by means of the car engine rather than by motors 48 and 74, simply by placing the car in reverse gear. After the rear wheels have been washed or otherwise serviced, the car may be driven forwardly onto exit ramp 4. The traction necessary to drive the car off the rollers under its own power is furnished by rollers 18 and 50, which are locked against rotation in a direction corresponding to forward travel of the automobile by dogs 80.

While I have shown and described a specific embodiment of my invention, it is believed apparent that many minor changes of structure and operation could be made without departing from the spirit of the invention as defined by the scope of the appended claims.

What I claim as new and desire to secure by Letters Patent is:

1. A revolving wheel support for automobiles comprising a base, a first set of rollers carried for rotation by said base on parallel axes and adapted to receive and support an automobile wheel thereon, a second set of rollers carried for rotation by said base on parallel axes and adapted to receive the opposite corresponding wheel of said automobile, said first roller set having guides fixed on certain of the rollers thereof whereby to prevent appreciable movement of the wheel supported thereby longitudinally of said roller, and the rollers of said second set being relatively elongated, whereby the device is adapted to accommodate automobiles having varying spacing between the wheels thereof, and power means carried by said base and operable to rotate at least one roller of each of said sets of rollers.

2. A revolving wheel support for automobiles comprising a base, a first set of rollers carried for rotation by said base on parallel axes and adapted to receive and support an automobile wheel thereon, a second set of rollers carried for rotation by said base on parallel axes and adapted to receive the opposite corresponding wheel of said automobile, said first roller sets having guides fixed on certain of the rollers thereof whereby to prevent appreciable movement of the wheel supported thereby longitudinally of said rollers, and the rollers of said second set being relatively elongated, whereby the device is adapted to accommodate automobiles having varying spacing between the wheels thereof, said base forming an entry ramp adjacent said rollers over which an automobile may be driven to position two wheels thereof on said first and second roller sets, respectively, and a pair of raised curbs formed on said ramp and positioned to direct one wheel of said automobile onto said first set of rollers between the guides thereof, and power means carried by said base and operable to rotate at least one roller of each of said sets of rollers.

References Cited in the file of this patent

UNITED STATES PATENTS

| | | |
|---|---|---|
| 1,132,725 | Lally | Mar. 23, 1915 |
| 1,161,982 | Scheidler | Nov. 30, 1915 |
| 1,795,244 | Bernet et al. | Mar. 3, 1931 |
| 1,795,365 | Hackl | Mar. 10, 1931 |
| 1,875,237 | Hambley | Aug. 30, 1932 |
| 2,490,921 | Rousseau | Dec. 13, 1949 |
| 2,496,787 | Fox | Feb. 7, 1950 |

FOREIGN PATENTS

| | | |
|---|---|---|
| 935,191 | France | Feb. 2, 1948 |
| 986,881 | France | Apr. 4, 1951 |